3,051,757
SULFONE PREPARATION PROCESS
Howard Johnston, Concord, Calif., assignor to The Dow Chemical Company, Midland, Mich., a corporation of Delaware
No Drawing. Filed May 11, 1960, Ser. No. 28,219
4 Claims. (Cl. 260—607)

The present invention is concerned with the industrial production of organic chemical compounds and is especially directed to a new and inventive process for the preparation of hexabromodimethylsulfone. The compound to be prepared according to the method of the present invention is known in the art. Preparations of the compound by two independent workers are reported in Chemical Abstracts, volume 25, pages 1487–8 and also in the same source volume 34, column 2792, section 6. In the work reported in each of these references, the compound was prepared by the bromination of the sodium salt of 2-propene-3-sulfonyl acetate. This starting acetate material corresponds to the formula:

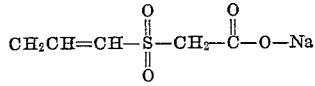

This starting acetate material is not readily available and is relatively expensive. Moreover, preparation of the relatively simple hexabromodimethylsulfone

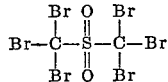

from the said acetate starting material is relatively wasteful of starting material, so small a portion of the starting material appearing in the finished product.

Hexabromodimethyl sulfone is useful as a fungicide, nematocide and insecticide. However, the conduct of even enough investigation to ascertain its commercial applicability, not to mention the question of providing market supplies if the demand exists, clearly calls for a better method of preparation of the compound.

According to the present invention, I have discovered an improvement in a new and more efficient process for the preparation of hexabromodimethyl sulfone. The novel method is simple, of good efficiency, adaptable to equipment commonly available in industrial chemical production plants, and calls for starting materials which are readily available in the market. The resulting product is of a good purity and easily separated from the reaction mixture wherein, according to the present invention, it is prepared.

According to the present invention I have discovered that hexabromodimethyl sulfone may be prepared easily, and in high yield with good purity by the direct bromination of dimethylsulfoxide in an aqueous solution containing an alkali metal hydroxide. The reaction takes place at temperatures between about $-20°$ C. and $80°$ C. and goes forward smoothly at temperatures between about $-10°$ C. and $20°$ C. When it is desired to obtain optimum yields with short reaction time, the preferred temperature range is between about $0°$ C. and about $10°$ C.

The proportions of the reactants to be employed are not critical. Some of the desired product is prepared with any of the reactants in disproportion to the others. However, when it is desired to obtain the product promptly and in good yield, at least about 4 to 5 moles of bromine should be employed for each mole of dimethylsulfoxide. Even though the proportional content of bromine in the product hexabromodimethyl sulfone exceeds the ratio of reactant bromine to sulfoxide thus suggested, it has been determined that at the stated molar ratio, a product of high purity is obtained in a relatively short time and with good efficiency; whereas, when bromine is present in the ratio of about 6 moles that is, 6 $Br_2$ per mole of dimethylsulfoxide (an amount corresponding much more nearly to the ratio of bromine to sulfoxide moiety in the desired product), the reaction does not go forward so rapidly nor with so great efficiency. The reasons for this are not fully understood but may be in part explained by the onset of competing reactions of uncertain course, whereby the desired reaction according to the present invention is deprived of some advantageous unidentified intermediate substance.

The alkali metal hydroxide enters into the reaction, rather than simply catalysing it; and the amount of such hydroxide employed should be sufficient to provide about one hydroxyl for each employed bromine atom. Thus, at least about 8 to 10 moles of alkali metal hydroxide per mole of dimethylsulfoxide should be used. However, when larger proportions of bromine are employed correspondingly larger portions of alkali metal hydroxide should be used.

When the primary consideration is economy of operation, sodium hydroxide will usually be the preferred alkali metal hydroxide. However, other alkali metal hydroxides such as potassium hydroxide, lithium hydroxide, and the like may be used with equally good results in the instant process.

In carrying out the process, it is convenient first to prepare aqueous solutions of each of the alkali metal hydroxide and dimethyl sulfoxide. The resulting aqueous solutions may, desirably, be pre-cooled prior to the contacting together of such solutions whereby the reaction begins. Concentrations of the reactants in such aqueous solution are not critical. Relatively low concentrations such as from 2 to 5 percent of alkali metal hydroxide by weight of water are satisfactory. However, when such solutions are employed, relatively bulky amounts of aqueous reaction medium are necessary and the resulting process is inconvenient. Concentrations of from 40 to 60 percent of reactant by weight of resulting solution have been employed and give good results. However, higher concentrations than this up to the point of saturation of aqueous solvent may be employed with good results.

If desired, the amount of reactant per unit weight or unit volume of water may be precisely predetermined, so that a desired amount of reactant may be introduced into the reaction vessel or like reaction site by the simple expedient of weighing or volumetrically measuring aqueous solution thereof into such site.

Reactant bromine may, conveniently, be employed in pure liquid form. However, if desired, bromine may alternatively be dispersed in water or in organic solvent, prior to its employment in the method of the present invention.

Because the reaction of the present invention is exothermic, and because uncontrolled heat of reaction would tend to elevate temperatures of the reaction mixture above the temperatures whereat the reaction goes forward with greatest efficiency, it is usually preferred to provide means for removing heat of reaction. On a laboratory scale, such means may include ice baths, cooling water jackets, and the like. On an industrial scale, the use of industrial heat exchangers with suitable fluid coolant will commonly be preferred.

Heat of reaction may also be controlled, to a large extent, by regulating the rate of contacting of the reactants. Such contacting will usually be carried out slowly, portionwise, and with continuous stirring. Such continuous stirring or like agitation during the combination of the reactants and for a period of time thereafter not only hastens the reaction but increases efficiency, and is therefore much to be preferred over any method of reaction wherein no such agitation is provided.

Although all the starting materials and intermediate substances assumed to be formed incident to the process of the present invention are relatively water-soluble, the desired hexabromodimethylsulfone product is relatively insoluble in water and, as it forms, separates in the aqueous reaction mixture as a fluffy, white, crystalline precipitate. The product is separated from the reaction mixture easily by filtration, centrifugation, decantation, and like methods. When it is desired to purify the product, the simple expedient of washing with water usually suffices to remove impurities of any significance.

As will immediately be apparent to those skilled in the art, the process of the present invention may, if desired, be performed batchwise and intermittently. Alternatively, by simple adaptation to known industrial process techniques, the method may be carried out continuously with the continuous supply of reactants and removal of desired products.

The following examples serve only to illustrate the present invention, the scope of which is as defined in the claims hereof.

*Example 1*

A solution of 16 grams (0.2 mole) dimethylsulfoxide in 25 milliliters water was introduced into a flask provided with a thermometer, stirring means, cooling means, and means for introduction of further reactant substances and adapted to be used as a reaction vessel. The flask and sulfoxide solution contents were then cooled to approximately 0° C.

A 200 milliliter aqueous solution of 80 grams sodium hydroxide was also prepared and cooled to approximately 0° C.

Stirring of the reaction vessel contents was begun, approximately 10 milliliters of said sodium hydroxide solution was introduced thereinto, and at the same time liquid bromine was introduced dropwise while external cooling maintained the temperature of the resulting reaction mixture between 0° C. and 10° C. Portionwise addition of both the sodium hydroxide solution and liquid bromine was continued over a period of time. During 1 hour, a total of 160 grams (1 mole) bromine was added, during which time the entire said sodium hydroxide solution was also added. Thereafter, cooling and stirring were continued for 25 minutes further. During the reaction time including the stirring time subsequent to the addition of the reactants, a voluminous fluffy white hexabromodimethylsulfone precipitate formed in the reaction mixture and was thereafter separated therefrom by filtration. The product was then washed with cold water to obtain 85 grams of hexabromodimethylsulfone which may also be called bis(tribromomethyl)sulfone. The yield corresponds to approximately 75 percent of the employed dimethyl sulfoxide. The resulting product melted at 133–134° C. and was found to be readily soluble in benzene, chloroform, and various other organic solvents. It was found by analysis to contain 85 percent bromine and 5.69 percent sulfur as compared with theoretical values of 84.5 percent and 5.64 percent respectively, all by weight. The melting point may be compared with the melting point found in the reference first cited hereinbefore, of 131–132.5° C.

*Example 2*

In procedures generally similar to those described in Example 1, 96.0 grams (2.4 moles) sodium hydroxide were dissolved in water to obtain 240 milliliters solution which was then cooled to 0° C. A second solution consisting of 16 grams (0.2 mole) of dimethyl sulfoxide dissolved in 25 milliliters of water was also prepared and cooled to about 0° C. The said sulfoxide solution was added slowly and portionwise to the sodium hydroxide solution while simultaneously liquid bromine was added dropwise to the resulting mixture until 192 grams (1.2 moles) bromine had been added thereto. By external cooling, the temperature of the reaction mixture was continuously maintained between about 0° C. and 5° C. The product hexabromodimethyl sulfone which separated during and after the combining of the reactants was recovered as in Example 1 and was found to weight approximately 81 grams. This weight corresponds to a yield of 71 percent based upon employed dimethylsulfoxide.

The present compound hexabromodimethylsulfone which may also be called bis(tribromomethyl)sulfone has various uses. It is a highly effective miticide. Also, when suitably formulated, it is useful as a fungicide for the control of fungus diseases of plants. It has value also as an insecticide for the control of houseflies, and cockroaches. Similarly, it may be employed as a nematocide. Also, the compound has value for the control of internal parasites of warm-blooded animals. For such use, the compound may be dispersed upon an inert finely-divided solid and the resulting preparation employed as a dust. Also, such preparations may be dispersed in water with or without a wetting agent and the resulting aqueous dispersions used as sprays. In other procedures, the compounds may be employed in oil or as a constituent of oil-in-water or water-in-oil emulsions or as aqueous dispersions thereof which may be applied as spray, drench, or wash. In a representative operation, the application as a thorough wetting spray to young bean plants heavily infected with two-spotted spider mites (*Tetranychus bimaculatus*) of an aqueous composition containing 500 parts of the present compound per million parts by weight of ultimate composition, afforded 100 percent kill of the said spider mites.

I claim:

1. Process which comprises the step of reacting together dimethylsulfoxide, alkali metal hydroxide, and bromine, in aqueous medium.

2. Process according to claim 1 modified by addition of the further step of separation of hexabromodimethylsulfone from the resulting reaction mixture.

3. Method of claim 1 modified by carrying out the reaction at a temperature in the range of 0° C. to +10° C.

4. Method of claim 3 wherein about 4 to 5 moles of bromine and about 8 to 10 moles alkali metal hydroxide are employed per mole of dimethylsulfoxide reactant.

References Cited in the file of this patent

UNITED STATES PATENTS 2,628,982    James _____ Feb. 17, 1953

OTHER REFERENCES

Feichtinger et al.: Ber. Deut. Chem. 81, 371–375 (1948).